UNITED STATES PATENT OFFICE.

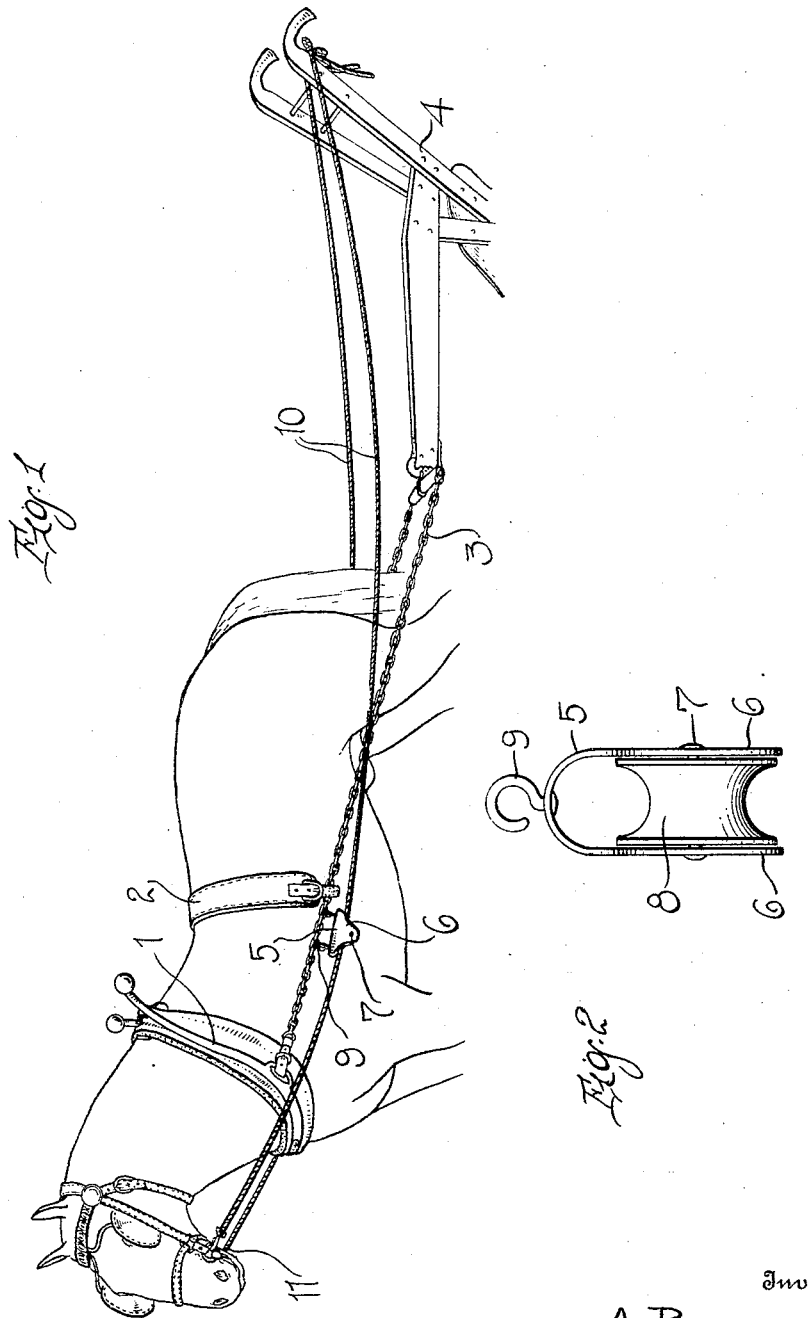

AARON PARRISH, OF QUITMAN, GEORGIA.

PLOW-LINE HOLDER.

1,118,224.  Specification of Letters Patent.  Patented Nov. 24, 1914.

Application filed May 14, 1914. Serial No. 838,609.

*To all whom it may concern:*

Be it known that I, AARON PARRISH, a citizen of the United States, residing at Quitman, in the county of Brooks and State of Georgia, have invented certain new and useful Improvements in Plow-Line Holders, of which the following is a specification, reference being had to the accompanying drawings.

This invention relates to improvements in plow line holders, and an object thereof is the provision of a holder of this character which is connected to the trace chain of the harness.

Plow lines now in use are merely connected to the bits, and passed through loops or rings on the back band of the animal and thence extended rearwardly to the handle of the plow. Plow lines which are usually formed of cotton or hemp are quickly worn out owing to the friction between the lines and the loops or rings, and it is an object of my invention to provide an improved holder or carrier which will support a plow line without friction, so that the line may be used a relatively long time.

A further object of this invention is the provision of a plow line holder which comprises a yoke, means being provided to suspend the yoke from the trace chain of the harness, the yoke carrying a grooved roller to receive the line, whereby the line may be passed through the yoke with a minimum amount of friction.

A still further object of this invention is the provision of a plow line holder which comprises an elongated yoke in which a roller is mounted, the yoke having hooks connected thereto at its opposite ends for engagement with adjacent links of the trace chain of the harness, whereby the yoke is allowed to swing from side to side when the line is being drawn therethrough, to prevent friction between the line and the arms of the yoke.

With these and other objects in view, my invention consists in the novel construction, combination, and arrangement of parts to be hereinafter more fully described, claimed, and illustrated in the accompanying drawing, in which, Figure 1 is a perspective view of my invention showing the same applied to use; and Fig. 2 is an end view thereof detached.

Referring more particularly to the drawing, the numeral 1 designates the hames, 2 the back band, and 3 the trace chain of the harness which are connected to the draft animal of the plow 4, in the usual manner.

My improved line holder or carrier comprises an elongated plate 5 which is curved longitudinally to provide a pair of spaced parallel arms, whereby the plate forms a yoke, the arms of the yoke being formed with depending apertured lugs 6 in which the opposite ends of the shaft 7 are mounted, a grooved roller 8 being mounted on the shaft between the arms of the yoke. Swivelly connected in the curved portion of the plate at its opposite ends, is a pair of hooks 9 which are connected to adjacent links of the trace chain 3. It will, of course, be understood that one of the yokes 5 is connected to each of the trace chains 3 on the opposite sides of the animal and the plow lines 10 are connected at their forward ends to the opposite ends of the bit 11, the lines being extended through the yokes 5 to engage the rollers 8 carried therein, and the rear end of the lines being connected to the handles of the plow 4 in the usual manner.

In the practical use of my improved device, the animal is driven over the field so that the plow 4 will form the furrows in the usual manner, and when the plow reaches the end of a furrow and it is desired to turn the plow to form a new furrow, the proper line 10 is drawn rearwardly to turn the animal in the desired direction, and it will be seen that owing to the loose connection of the hooks 9 with the trace chains, the yoke may also swing in any necessary direction to prevent tangling or wedging of the line with the harness. Owing to the elongated shape of the yokes 5, it will be seen that the rollers 8 are amply protected from rain so that moisture will be prevented from engaging between the rollers and the arms of the yokes, and that by providing a plow line support which includes a roller over which the line engages, all friction between the line and its support is reduced to a minimum, so that the necessity of frequent changes of lines is prevented.

Having thus fully described my invention, what I desire to claim and secure by Letters Patent, is:—

In combination with a harness trace chain for plows or the like, of a plow line holder comprising an elongated yoke, a grooved roller mounted in said yoke, and hooks carried by said yoke at its ends, said hooks being loosely connected to adjacent links of the trace chain.

In testimony whereof I hereunto affix my signature in the presence of two witnesses.

AARON PARRISH.

Witnesses:
L. L. LEE,
B. H. PETERS.

Copies of this patent may be obtained for five cents each, by addressing the "Commissioner of Patents, Washington, D. C."